US006441856B1

(12) United States Patent
Sugimoto

(10) Patent No.: US 6,441,856 B1
(45) Date of Patent: *Aug. 27, 2002

(54) DIGITAL CAMERA, HAVING A FLASH UNIT, WHICH DETERMINES PROPER FLASH DURATION THROUGH AN ASSESSMENT OF IMAGE LUMINANCE AND, WHERE NEEDED, A PRELIMINARY FLASH EMISSION

(75) Inventor: Kazuhiko Sugimoto, Shijyonawate (JP)

(73) Assignee: Sanyo Electric Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/665,087

(22) Filed: Sep. 20, 2000

Related U.S. Application Data

(63) Continuation of application No. 08/895,405, filed on Jul. 16, 1997.

(30) Foreign Application Priority Data

Jul. 18, 1996 (JP) ............................................. 8-189621
Jul. 18, 1996 (JP) ............................................. 8-189622

(51) Int. Cl.$^7$ ............................................. H04N 5/222
(52) U.S. Cl. ....................................... 348/371; 348/370
(58) Field of Search ................................ 348/362, 364, 348/367, 370, 371, 234; 396/157, 159, 161, 391

(56) References Cited

U.S. PATENT DOCUMENTS

| | | | | |
|---|---|---|---|---|
| 4,367,932 A | * | 1/1983 | Ishikawa et al. | 396/159 |
| 4,460,263 A | * | 7/1984 | Gfeller et al. | 354/415 |
| 4,717,934 A | * | 1/1988 | Kobayashi et al. | 396/157 |
| 4,843,476 A | * | 6/1989 | Fujioka et al. | 358/228 |
| 5,006,879 A | * | 4/1991 | Takagi et al. | 396/162 |
| 5,111,301 A | * | 5/1992 | Haruki et al. | 348/364 |
| 5,155,581 A | * | 10/1992 | Tanaka et al. | 348/223 |
| 5,202,720 A | * | 4/1993 | Fujino et al. | 396/158 |
| 5,227,836 A | * | 7/1993 | Yasukawa et al. | 354/415 |
| 5,400,112 A | * | 3/1995 | Takagi | 396/157 |
| 5,438,367 A | * | 8/1995 | Yamamoto et al. | 348/371 |
| 5,550,611 A | * | 8/1996 | Ishida et al. | 396/213 |
| 5,786,852 A | * | 7/1998 | Suzuki et al. | 348/312 |
| 5,808,681 A | * | 9/1998 | Kitajima | 348/371 |
| 5,860,029 A | * | 1/1999 | Ichikawa et al. | 396/61 |
| 6,195,127 B1 | * | 2/2001 | Sugimoto | 348/370 |

FOREIGN PATENT DOCUMENTS

| | | | |
|---|---|---|---|
| DE | 31 39 806 | * | 4/1983 |
| EP | 0 662 629 | * | 7/1995 |
| JP | 01-289925 | * | 11/1989 |
| JP | 02-087127 | * | 3/1990 |
| JP | 02-121579 | * | 5/1990 |
| JP | 03-089329 | * | 4/1991 |
| JP | 03-240030 | * | 10/1991 |
| JP | 04-078829 | * | 3/1992 |
| JP | 04-088762 | * | 3/1992 |
| JP | 04-134437 | * | 5/1992 |
| JP | 04-257830 | * | 9/1992 |
| JP | 08-160489 | * | 6/1996 |

* cited by examiner

Primary Examiner—Wendy R. Garber
Assistant Examiner—Mitchell White
(74) Attorney, Agent, or Firm—Michaelson & Wallace; Peter L. Michaelson

(57) ABSTRACT

A digital camera includes a flash lamp and a CCD imager. A microcomputer first exposes the CCD imager without a light-emission of the flash lamp. Therefore, a luminance evaluation value is calculated by a calculator on the basis of a luminance signal included in a camera signal generated by the CCD imager. The microcomputer succeedingly makes the flash lamp perform a preliminary light-emission, and exposes the CCD imager by $1/1500$ seconds. The calculator evaluates the luminance evaluation value on the basis of the luminance signal included in the camera signal obtained at this time. Then, the microcomputer calculates a major light-emission amount of the flash lamp on the basis of the two luminance evaluation values obtained in such a manner.

14 Claims, 13 Drawing Sheets

| R | G | R | G | R | G | R | G | R | G |
|---|---|---|---|---|---|---|---|---|---|
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |

|  | $A_{1,1}$ | $A_{1,2}$ | $A_{1,3}$ |  |  |  |  |  |  |  |  |  |  |  | $A_{1,16}$ |
|---|---|---|---|---|---|---|---|---|---|---|---|---|---|---|---|---|
|  | 1 | 1 | 1 | 1 | 1 | 1 | 1 | 1 | 1 | 1 | 1 | 1 | 1 | 1 | 1 | 1 |
| $A_{2,1}$ | 1 | 1 | 1 | 1 | 1 | 1 | 1 | 1 | 1 | 1 | 1 | 1 | 1 | 1 | 1 | 1 |
| $A_{3,1}$ | 1 | 1 | 1 | 1 | 1 | 1 | 1 | 1 | 1 | 1 | 1 | 1 | 1 | 1 | 1 | 1 |
| ⋮ | 1 | 1 | 1 | 1 | 1 | 1 | 1 | 1 | 1 | 1 | 1 | 1 | 1 | 1 | 1 | 1 |
|  | 1 | 1 | 1 | 1 | 1 | 1 | 2 | 2 | 2 | 2 | 1 | 1 | 1 | 1 | 1 | 1 |
|  | 1 | 1 | 1 | 1 | 1 | 2 | 2 | 2 | 2 | 2 | 2 | 1 | 1 | 1 | 1 | 1 |
|  | 1 | 1 | 1 | 1 | 2 | 2 | 3 | 3 | 3 | 3 | 2 | 2 | 1 | 1 | 1 | 1 |
|  | 1 | 1 | 1 | 1 | 2 | 2 | 3 | 3 | 3 | 3 | 2 | 2 | 1 | 1 | 1 | 1 |
|  | 1 | 1 | 1 | 1 | 2 | 2 | 3 | 3 | 3 | 3 | 2 | 2 | 1 | 1 | 1 | 1 |
|  | 1 | 1 | 1 | 1 | 2 | 2 | 3 | 3 | 3 | 3 | 2 | 2 | 1 | 1 | 1 | 1 |
|  | 1 | 1 | 1 | 1 | 1 | 2 | 2 | 2 | 2 | 2 | 2 | 1 | 1 | 1 | 1 | 1 |
|  | 1 | 1 | 1 | 1 | 1 | 1 | 2 | 2 | 2 | 2 | 1 | 1 | 1 | 1 | 1 | 1 |
|  | 1 | 1 | 1 | 1 | 1 | 1 | 1 | 1 | 1 | 1 | 1 | 1 | 1 | 1 | 1 | 1 |
|  | 1 | 1 | 1 | 1 | 1 | 1 | 1 | 1 | 1 | 1 | 1 | 1 | 1 | 1 | 1 | 1 |
|  | 1 | 1 | 1 | 1 | 1 | 1 | 1 | 1 | 1 | 1 | 1 | 1 | 1 | 1 | 1 | 1 |
|  | 1 | 1 | 1 | 1 | 1 | 1 | 1 | 1 | 1 | 1 | 1 | 1 | 1 | 1 | 1 | 1 |
|  | $A_{16,1}$ |  |  |  |  |  |  |  |  |  |  |  |  |  |  | $A_{16,16}$ |

| | $A_{1,1}$ | $A_{1,2}$ | $A_{1,3}$ | | | | | | | | | | | | | $A_{1,16}$ |
|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 |
| $A_{2,1}$ | 0 | 0 | 0 | 0 | 0 | 0 | 0 | 0 | 0 | 0 | 0 | 0 | 0 | 0 | 0 | 0 |
| $A_{3,1}$ | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 1 | 1 | 1 | 1 | 0 | 0 | 0 | 0 | 0 | 0 |
| | 0 | 0 | 0 | 0 | 0 | 1 | 2 | 2 | 2 | 2 | 1 | 0 | 0 | 0 | 0 | 0 |
| | 0 | 0 | 0 | 0 | 1 | 2 | 2 | 4 | 4 | 2 | 2 | 1 | 0 | 0 | 0 | 0 |
| | 0 | 0 | 0 | 0 | 1 | 2 | 4 | 6 | 6 | 4 | 2 | 1 | 0 | 0 | 0 | 0 |
| | 0 | 0 | 0 | 0 | 1 | 2 | 4 | 6 | 6 | 4 | 2 | 1 | 0 | 0 | 0 | 0 |
| | 0 | 0 | 0 | 0 | 1 | 2 | 2 | 4 | 4 | 2 | 2 | 1 | 0 | 0 | 0 | 0 |
| | 0 | 0 | 0 | 0 | 0 | 1 | 2 | 2 | 2 | 2 | 1 | 0 | 0 | 0 | 0 | 0 |
| | 0 | 0 | 0 | 0 | 0 | 0 | 1 | 1 | 1 | 1 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | $A_{16,1}$ | | | | | | | | | | | | | | | $A_{16,16}$ |

DIGITAL CAMERA, HAVING A FLASH UNIT, WHICH DETERMINES PROPER FLASH DURATION THROUGH AN ASSESSMENT OF IMAGE LUMINANCE AND, WHERE NEEDED, A PRELIMINARY FLASH EMISSION

This application is a continuation of co-pending patent application Ser. No. 08/895,405 filed Jul. 16, 1997 and entitled "A DIGITAL CAMERA, HAVING A FLASH UNIT, WHICH DETERMINES PROPER FLASH DURATION THROUGH AN ASSESSMENT OF IMAGE LUMINANCE AND, WHERE NEEDED, A PRELIMINARY FLASH EMISSION (as amended)".

BACKGROUND OF THE INVENTION

1. Field of the Invention

The present invention relates to a digital camera. More specifically, the present invention relates to a digital camera for taking a picture of an object by making a flash lamp perform a light-emission with a major light-emission amount and by exposing a picture taking means for a first period.

2. Description of the Prior Art

There was a conventional digital camera in which in a case where a luminance level of the object is lower than a desired luminance level, a luminance level of the object is calculated by making a flash lamp perform a preliminary light-emission, and the major light-emission amount of the flash lamp is calculated on the basis of the luminance level. More specifically, with referring to FIG. 13, in a case where a luminance level $E_0$ without the light-emission of the flash lamp is lower than a desired luminance level Et, a luminance level Es is detected by making the flash lamp perform the preliminary light-emission, the major light-emission amount is calculated on the basis of a luminance level Es, and the flash lamp is light-emitted with the major light-emission amount, therefore, a shortage amount of the luminance level is supplemented.

However, in such a prior art, in a case where the object exists under a fluorescent lamp which generates a flicker, since the luminance level Es in the preliminary light-emission changes about 5% there was a problem in that it was difficult to precisely calculate the major light-emission amount. That is, in the prior art, though the shortage amount is divided by the luminance level Es whereby the major light-emission amount is calculated, if an exposure period in the preliminary light-emission is long, the luminance level Es is changed by an influence of the flicker, therefore, there was a possibility that the major light-emission amount drastically deviates.

SUMMARY OF THE INVENTION

Therefore, the principal object of the present invention is to provide a novel digital camera.

Another object of the present invention is to provide a digital camera capable of precisely calculating a major light-emission element of a flash lamp.

Further object of the present invention is to provide a digital camera capable of calculating a most suitable major light-emission element in a set mode.

According to the present invention, a digital camera for taking a picture of an object by making a flash lamp perform a major light-emission with a major light-emission amount and exposing a picture taking means for a first period comprises: a detection means for detecting a luminance signal from a camera signal outputted from the picture taking means; an evaluation means for evaluating the luminance signal and outputting a luminance evaluation value; a first control means for exposing the picture taking means without a light-emission of the flash lamp; a second control means for making the flash lamp perform a preliminary light-emission with a preliminary light-emission amount and exposing the picture taking means for a second period shorter than the first period; and a calculation means for calculating the major light-emission amount on the basis of a first non-emission luminance evaluation value outputted from the evaluation means in response to a control of the first control means and a preliminary light-emission luminance evaluation value outputted from the evaluation means in response to a control of the second control means.

The first control means exposes the picture taking means without the light-emission of the flash lamp, therefore, the first non-emission luminance evaluation value is obtained from the evaluation means. The second control means makes the flash lamp perform the preliminary light-emission with the preliminary light-emission amount, and exposes the picture taking means for the second period, therefore, the preliminary light-emission luminance evaluation value is obtained from the evaluation means. The calculation means calculates the major light-emission amount on the basis of the first non-emission luminance evaluation value and the preliminary light-emission luminance evaluation value. The flash lamp is light-emitted with the major light-emission amount, and the picture taking means is exposed for the first period at this time. In addition, the second period is defined to be shorter than the first period.

In an aspect of the present invention, the first control means exposes the picture taking means for a third period. Then, a luminance evaluation value calculation means calculates a second non-emission luminance evaluation value in exposing the picture taking means for the first period without the light-emission of the flash lamp, on the basis of the first period, the third period and the first non-emission luminance evaluation value. Furthermore, a major light-emission amount calculation means calculates the major light-emission amount on the basis of the second non-emission luminance evaluation value, a target luminance evaluation value, the preliminary light-emission luminance evaluation value and the preliminary light-emission amount.

In an embodiment of the present invention, an exposure period calculation means calculates a most suitable exposure period in which the target luminance evaluation value is obtained without the light-emission of the flash lamp, on the basis of the third period, the first non-emission luminance evaluation value and the target luminance evaluation value. If the most suitable exposure period Is shorter than a longest exposure period which is a longest period capable of exposing the picture taking means, a cancellation means cancels the major light-emission. That is, since the target luminance evaluation value is obtained without the major light-emission, the cancellation means cancels the major light-emission.

According to the present invention, since an exposure period in the preliminary light-emission is defined to be shorter than the exposure period in the major light-emission, the preliminary light-emission luminance evaluation value is not influenced by an external light, therefore, it is possible to precisely calculate the major light-emission amount.

According to the present invention, a digital camera for taking a picture of an object by making a flash lamp perform a major light-emission with a major light-emission amount and by exposing a picture taking means comprises: a mode setting means for setting one of a first mode and a second mode; a first weighting amount table in which first weighting amount data is stored; a second weighting amount table in which second weighting amount data is stored; a detection means for detecting a luminance signal from a camera signal outputted from the picture taking means; a weighting means for weighting the luminance signal with a table corresponding to a set mode; a calculation means for calculating an output of the weighting means and outputting a luminance evaluation value; a first control means for making the flash lamp perform a preliminary light-emission and exposing the picture taking means; and a first computing means for computing the major light-emission amount on the basis of a preliminary light-emission luminance evaluation value outputted from the calculation means in response to an operation of the first control means.

The first control means makes the flash lamp perform the preliminary light-emission and exposes the picture taking means, whereby the camera signal is outputted from the picture taking means. When the first mode is set by the mode setting means, the weighting means weights the luminance signal included in the camera signal with the first weighting amount table. Furthermore, when the second mode is set by the mode setting means, the weighting means weights the luminance signal included in the camera signal with the second weighting amount table. The output of the weighting means is calculated by the calculation means, and the fist computing means computes the major light-emission amount on the basis of the preliminary light-emission luminance evaluation value outputted from the calculation means.

In an aspect of the present invention, the second control means exposes the picture taking means without the light-emission of the flash lamp, and the weighting means selects the first weighting amount table at this time. Then, a second computing means computes a most suitable exposure period in which a target luminance evaluation value is obtained without the light-emission of the flash lamp, on the basis of a second luminance evaluation value outputted from the calculation means in response to an operation of a second control means.

In the first mode, the most suitable exposure period is compared with a longest exposure period which is a longest period capable of exposing the picture taking means, if the most suitable exposure period is shorter than the longest exposure period, the major light-emission is cancelled. In addition, the first mode is an automatic light-emission mode in which the major light-emission is performed in response to the most suitable exposure period, and the first weighting amount data in a surrounding portion of the object is smaller than the first weighting amount data in a center portion of the object and larger than "0".

In the second mode, the most suitable exposure period and the longest exposure period are compared with each other, if the most suitable exposure period is shorter than the longest exposure period, the most suitable exposure period is held as an exposure period in the major light-emission, and if the most suitable exposure period is equal to the longest exposure period or longer than the longest exposure period, the longest exposure period is held as the exposure period in the major light-emission. In addition, the second mode is a forced light-emission mode for making the flash lamp perform the major light-emission without respect to the most suitable exposure period, and the second weighting amount data has a value of "0" in the surrounding portion of the object.

According to the present invention, since the table is changed in response to the set mode, it is possible to calculate the most suitable major light-emission amount for the mode.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing another portion of FIG. 1 embodiment;

FIG. 5 is an illustrative view showing further portion of FIG. 1 embodiment;

FIG. 6 is an illustrative view showing the other portion of FIG. 1 embodiment;

DETAILED DESCRIPTION OF THE PREFERRED EMBODIMENT

Figure 1:
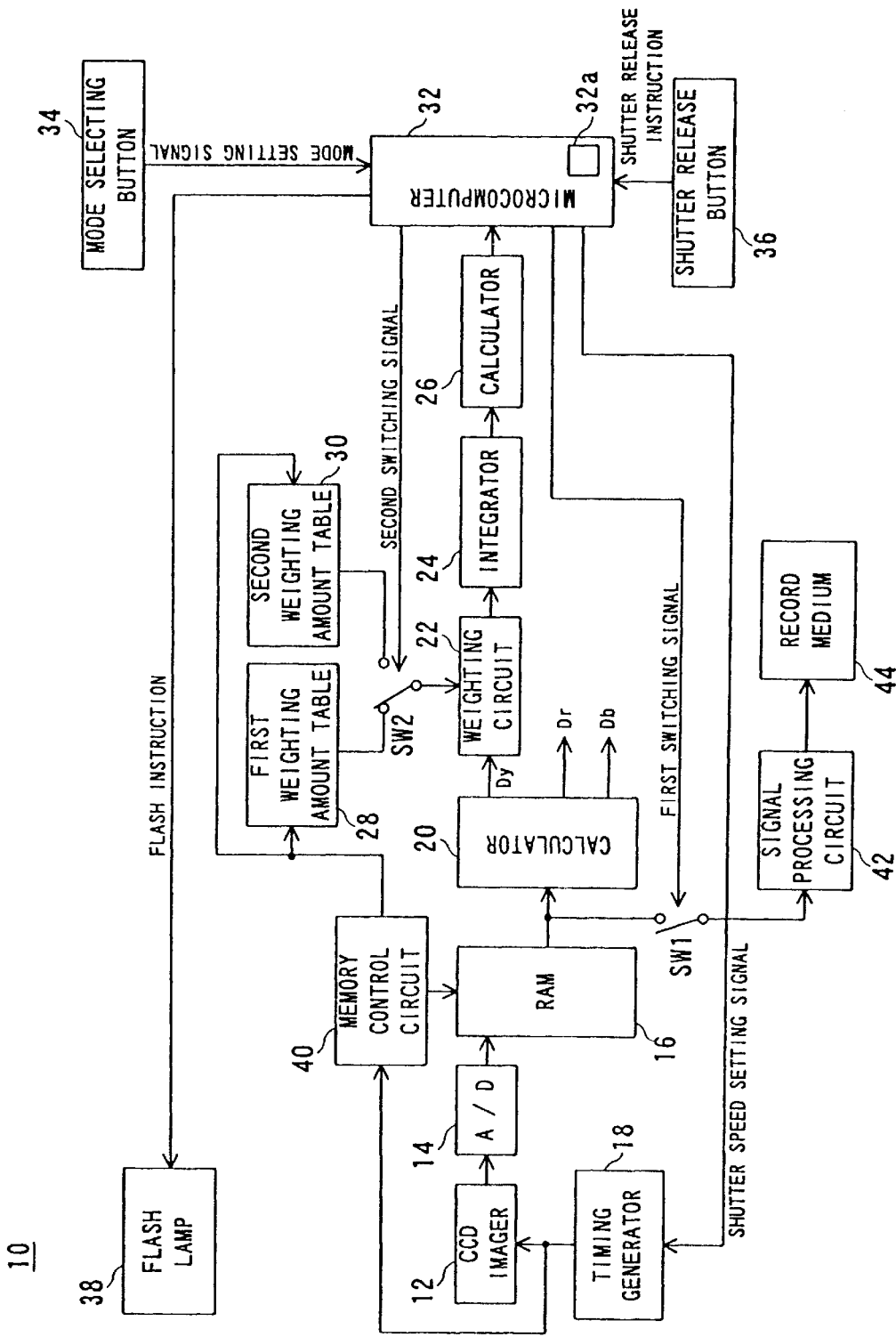
FIG. 1 is a block diagram showing one embodiment of the present invention.

One embodiment of the present invention is described in accordance with the drawings in the above. FIG. 1 is a block diagram showing a digital camera 10 of this embodiment.

Figure 2:
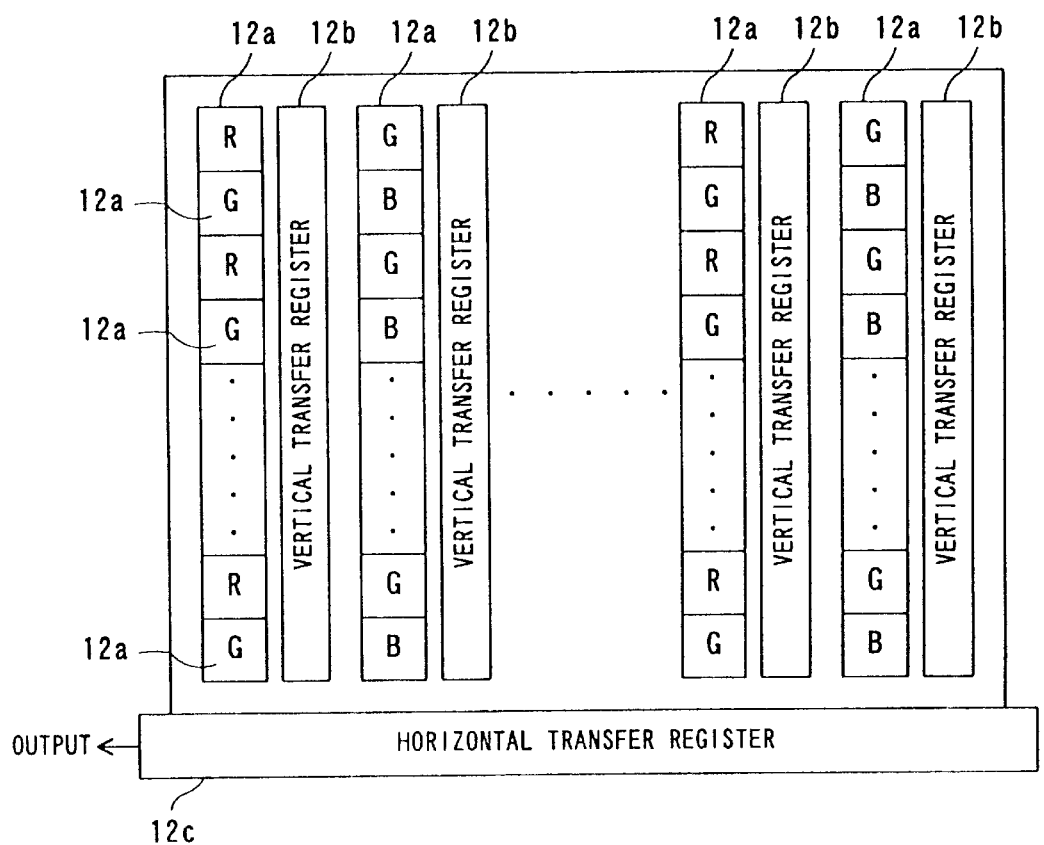
FIG. 2 is an illustrative view showing a portion of FIG. 1 embodiment.

A reference numeral "12" denotes a CCD imager for subjecting an optical image applied through an optical system to a photoelectric conversion and outputting a camera signal. A plurality of light receiving portions 12 are formed on the CCD imager 12 as shown in FIG. 2, a color filter 13 in which the three primary colors of R, G and B are arranged in mosaic like as shown in FIG. 3 is attached in front of the light receiving portions 12a. The light receiving portions 12a constitutes respective pixels of the CCD imager 12, and one of R, G and B arranged in the color filter 13 corresponds to one light receiving portion 12a.

The optical image passed through a lens (not shown) is applied to the light receiving portions 12a of the CCD imager 12 through the color filter 13 and subjected to the photoelectric conversion. Charges obtained in such a manner are accumulated in an exposure period, that is a charge accumulation period, determined in response to a shutter speed, thereafter, the charges are outputted.

In describing in detail, as shown in FIG. 2, the CCD imager 12 includes the plurality of light receiving portions 12a each of which corresponds to one pixel, a plurality of vertical transfer registers 12b for transferring in the vertical direction the charges obtained by the photoelectric conversion and accumulated in such light receiving portions 12a and a horizontal transfer register 12c provided at ends of the respective vertical transfer registers 12b and for transferring in the horizontal direction the charges transferred by the vertical transfer registers 12b, and the CCD imager 12 is driven by timing signals outputted from a timing generator 18. Now, in the timing signals, there are a reading pulse for reading out the charges from the light receiving portions 12a to apply the charges to the vertical transfer registers 12b, a vertical transfer pulse for transferring the charges in the vertical transfer registers 12b for each line in the vertical direction, a horizontal transfer pulse for transferring the charges in the horizontal transfer register 12c for each pixel in the horizontal direction, a sweeping pulse for sweeping the charges generated by the light receiving portions 12a in a non-exposure period, that is, non-charge accumulation period, and etc.

The timing generator 18 controls a period for outputting the sweeping pulse in response to a shutter speed instruction signal described below. Therefore, the charge accumulation period is controlled, and a desired shutter speed is obtained. In addition, a technology for controlling the shutter speed in response to an output period of the sweeping pulse in such a manner is well-known as an electronic shutter function.

Thus, the charges are generated by the CCD imager 12 for the respective pixels, and successively outputted as an image signal. Now, since the color filter 13 is formed as shown in FIG. 3, when accumulation of the charges is completed in the CCD imager 12, a G signal passed through a filter element of green existing at a lower left end is first outputted, succeedingly, a B signal passed through the filter element of blue adjacent to the filter element of green at the right side is outputted. Thus, when an output from the lowest line is completed, such a color signals are successively outputted from the second lowest line in the same manner.

A reference numeral "14" denotes an A/D converter for successively digitizing the image signal outputted from the imager 12, that is the color signals corresponding to the respective filter elements, and an output of the A/D converter 14 is sequentially written to a RAM 16 as image data.

Writing to the RAM 16 is controlled by a writing control signal from a memory control circuit 40. A plurality of addresses corresponding to the respective pixels of the CCD imager 12 are previously applied to the RAM 16. The memory control circuit 40 controls the writing on the basis of the timing signals from the timing generator 18 such that each color data included in the image data is memorized in a desired address. In addition, which pixel of the CCD imager 12 the inputted color data corresponds to is determined by a count value of a vertical counter which is reset by the reading pulse and incremented by the vertical transfer pulse, and a count value of a horizontal counter which is reset by the vertical transfer pulse and incremented by the horizontal transfer pulse.

Thus, the charges of all the pixels are fetched out at every time the CCD imager 12 is exposed, and the image data in which each pixel has one color component of R, G and B is to be memorized into the RAM 16.

Figure 4:
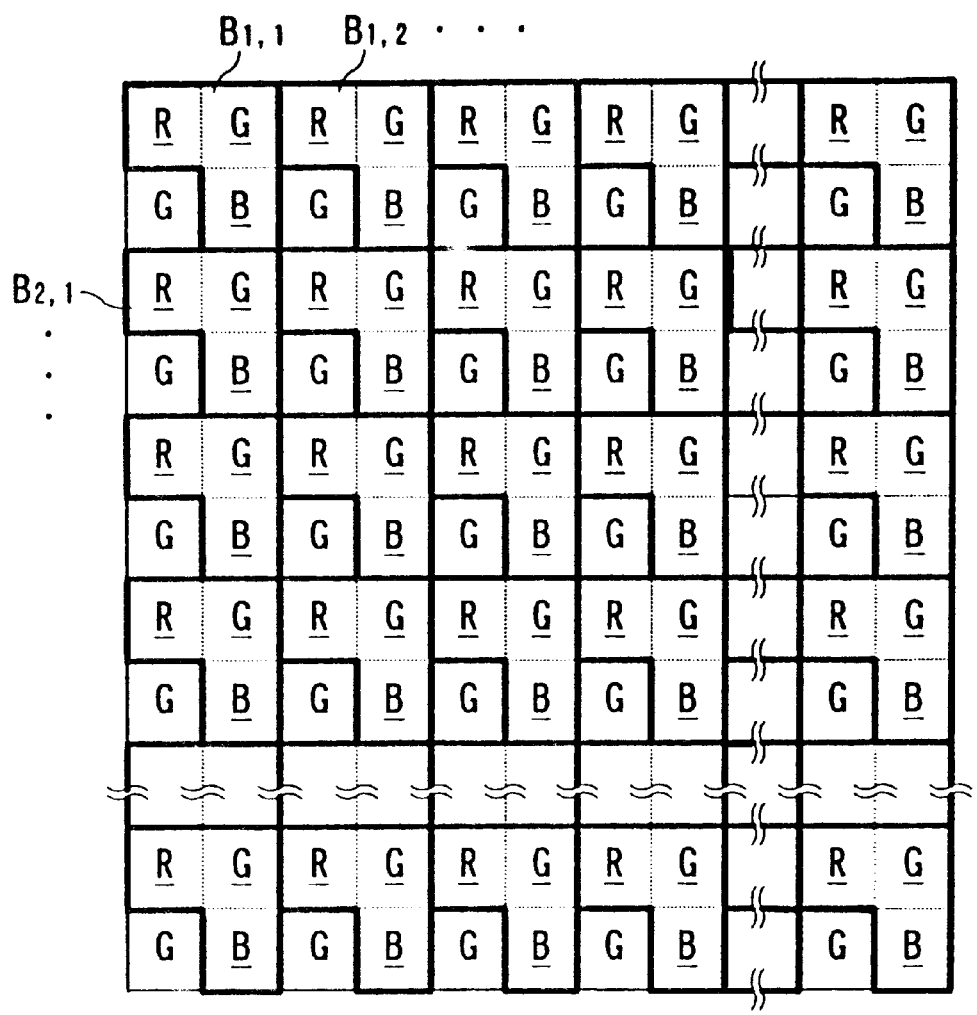
FIG. 4 is an illustrative view showing the other portion of FIG. 1 embodiment.

As shown in FIG. 4, one block is defined by three pixels including the filter elements of R, G and B one by one like a character "L" in the color filter 13, and a plurality of blocks Bm, n (m,n:integer) such as $B_{1,1}$, $B_{1,2}$ ... are formed. When the writing of all the color data to the RAM 16 is completed, the color data of R, G or B is read out at every block in accordance with a reading control signal from the memory control circuit 40. In addition, underlines are applied to the filter element forming each block, and each block is surrounded by a solid line. Furthermore, the filter elements of R, G and B included in each block are divided by dotted lines.

A reference numeral "20" denotes a calculator for generating luminance data Dy showing a level of a luminance signal Y, color difference data Dr showing a level of a color difference signal R–Y and color difference data Db showing a level of a color difference signal B–Y by substituting the color data of R, G and B included in the same block and read out into a predetermined equation. If the respective color data of R, G and B in a black are defined by "r", "g" and "b", the equation is shown as below.

$Dy=3r+6g+b$ $Dr=r-g$ $Db=b-g$

The luminance data Dy calculated in such a manner is inputted to a weighting circuit 22. The weighting circuit 22 subjects a weighting operation to the luminance data Dy in accordance with weighting amount data K held in a first weighting amount table 28 or a second weighting amount table 30. That is, the weighting circuit 22 multiplies the luminance data Dy by the weighting amount data K Now, the first weighting amount table 28 and the second weighting amount table 30 receive reading address data from the memory control circuit 40, and recognize which block of R, G and B data the luminance data and the color difference data outputted from the calculator 20 are generated from. Then, the first weighting amount table 28 and the second weighting amount table 30 output the weighting amount data K corresponding to a noted block.

In describing in detail, the first weighting amount table 28 is divided into 256 areas Ai, j (i, j: integers from 1 to 16) having 16 areas in the vertical direction and 16 areas in the horizontal direction as shown in FIG. 5, and the weighting amount data K having a value of "1", "2" or "3" is corresponded to each area. Each area Ai, j is larger than each block Bi, j, and a plurality of blocks Bm, n included in one area Ai, j have the same weighting amount data K. The first weighting amount table 28 detects an area relating to the luminance data and the color difference data outputted from the calculator 20, and applies the weighting amount data K corresponding to the detected area to the weighting circuit 22.

Similarly, the second weighting amount table 30 is also divided into 256 areas Ai, j (i, j : integers from 1 to 16) having 16 areas in the vertical direction and 16 areas in the horizontal direction as shown in FIG. 6, and the weighting amount data K having a value of "0", "1", "2", "4" or "6" is corresponded to each area. The second weighting amount table 30 detects an area relating to the luminance data and the color difference data outputted from the calculator 20, and applies the weighting amount data K corresponding to the detected area to the weighting circuit 22.

By the way, since a main object mainly exists in a center of a screen, in the first weighting amount table 28 shown in FIG. 5, the weighting amount data K has a value of "3" in 16 areas of the center, the weighting amount data K has a value of "2" in 36 areas which is surround the 16 areas and in which a possibility of existence of the main object is a little low, and the weighting amount data K has a value of "1" in the remained areas of the outside in which the possibility is drastically low. By subjecting the weighting operation to the luminance data in accordance with the weighting amount data K, it is possible to perform center emphasis photometry that a luminance level of the center of the screen is considered to be the most important and the luminance level of a surrounding area is also sufficiently considered.

On the other hand, in the second weighting amount table 30 shown in FIG. 6, the weighting amount data K has a drastically large value "6" in 4 areas of the center in which there is a high possibility of the existence of the main object, and the weighting amount data K has a value "4" a little smaller than "6" in 8 areas which surrounds the 4 areas and that the possibility of the existence of the main object is a little low. Furthermore, the weighting amount data K has a value "2" a little smaller than "4" in 20 areas which surrounds such 8 areas and that the possibility is a little low, and the weighting amount data K has a value "1" a little smaller than "2" in 20 areas which surrounds such 20 areas and that the possibility is a little low. Evenmore, in the remained areas surrounding such 20 areas, since the possibility of the existence of the main object is the lowest, and the possibility of the existence of a drastically high luminance light source such as a fluorescent lamp and the solar is high in a back light, a value "0" is applied to the remained area. Now, the value "0" means that the luminance level in the remained areas is substantially excluded in calculating an evaluation value described later.

A reference symbol SW2 denotes a switch for selecting one of the weighting amount data outputted from the first weighting amount table 28 and the second weighting amount table 30 to apply to the weighting circuit 22, and the switch SW2 is controlled by a second switching signal from a microcomputer 32 described later.

A reference numeral 24 denotes an integrator for calculating a total sum of the luminance data equal to one screen to which the weighting operation is performed in the weighting circuit 22, that is, for digitally integrating the luminance data through one screen. Each of the first weighting amount table 28 and the second weighting amount. table 30 has 256 weighting amount data in response to the respective luminance data Dy. The calculator 26 normalizes an integrated value from the integrator 24 by dividing the integrated value with a total sum of the 256 weighting amount data so as to calculate a luminance evaluation value Vy being an evaluation object in an exposure adjustment.

In addition, the two color difference data simultaneously outputted from the calculator 20 with the luminance data are used for a white balance adjustment operation in a white balance adjustment circuit not shown.

The microcomputer 32 determines the exposure period of the CCD imager 12, that is the shutter speed, for the exposure adjustment on the basis of the luminance evaluation value Vy applied from the calculator 26. The microcomputer 32 also instructs a timing of the exposure of the CCD imager 12, that is a timing of picture taking, on the basis of the determined shutter speed. Furthermore, the microcomputer 32 controls a light-emission of the flash lamp 38 and switching of the switches SW1 and SW2 on the basis of a shutter release instruction from a shutter release button 36 and the luminance evaluation value Vy.

The flash lamp 38 emits a light by a period instructed by a flash instruction from the microcomputer 32. A light-emission period of the flash lamp 38 determines a light-emission amount, the longer the light-emission period is, the larger the light-emission amount is. The shutter release button 36 inputs the shutter release instruction to the microcomputer 32 in response to a depression of an operator.

A signal processing circuit 42 receives the image data memorized in the RAM 16 through the switch SW1 after the shutter release instruction is inputted, and subjects a well-known signal processing such as a color separation, a gamma correction, signal compression and etc. to the image data, and output still image data. The still image data is recorded into a record medium 44 such as a flash memory and a memory card, for example, by the microcomputer 32. In addition, the switch SW1 is controlled by a first switching signal outputted from the microcomputer 32.

A reference numeral 34 denotes a mode selecting button 34 for selecting one of an automatic light-emission mode and a forced light-emission mode in response to an operation of the operator, and a mode setting signal for setting a selected mode is inputted to the microcomputer 32. The microcomputer 32 controls the switch SW2 by the second switching signal in response to the mode setting signal. More specifically, in a case where the automatic light-emission mode is selected by the mode selecting button 34, the switch SW2 is connected to a side of the first weighting amount table 28. In a case where the forced light-emission mode is selected, the switch SW2 is connected to the side of the first weighting amount table 30 in the exposure adjustment, and the switch SW2 is connected to a side of the second weighting amount table 30 in calculating the light-emission amount of the flash lamp 38.

Now, the automatic light-emission mode means a mode for making the flash lamp 38 perform a major light-emission to supplement a shortage amount in only a case where an exposure shortage cannot be dissolved even if the shutter speed is set into a minimum speed by the exposure adjustment operation, and it is desirable to select the automatic light-emission mode in a normal picture taking state. On the other hand, the forced light-emission mode means a mode for back light correction in which the flash lamp 38 always emits the light to optimize a light amount of the main object in a case where the main object in the center of the screen becomes a back light state by the drastically high luminance behind the main object.

Figure 7:
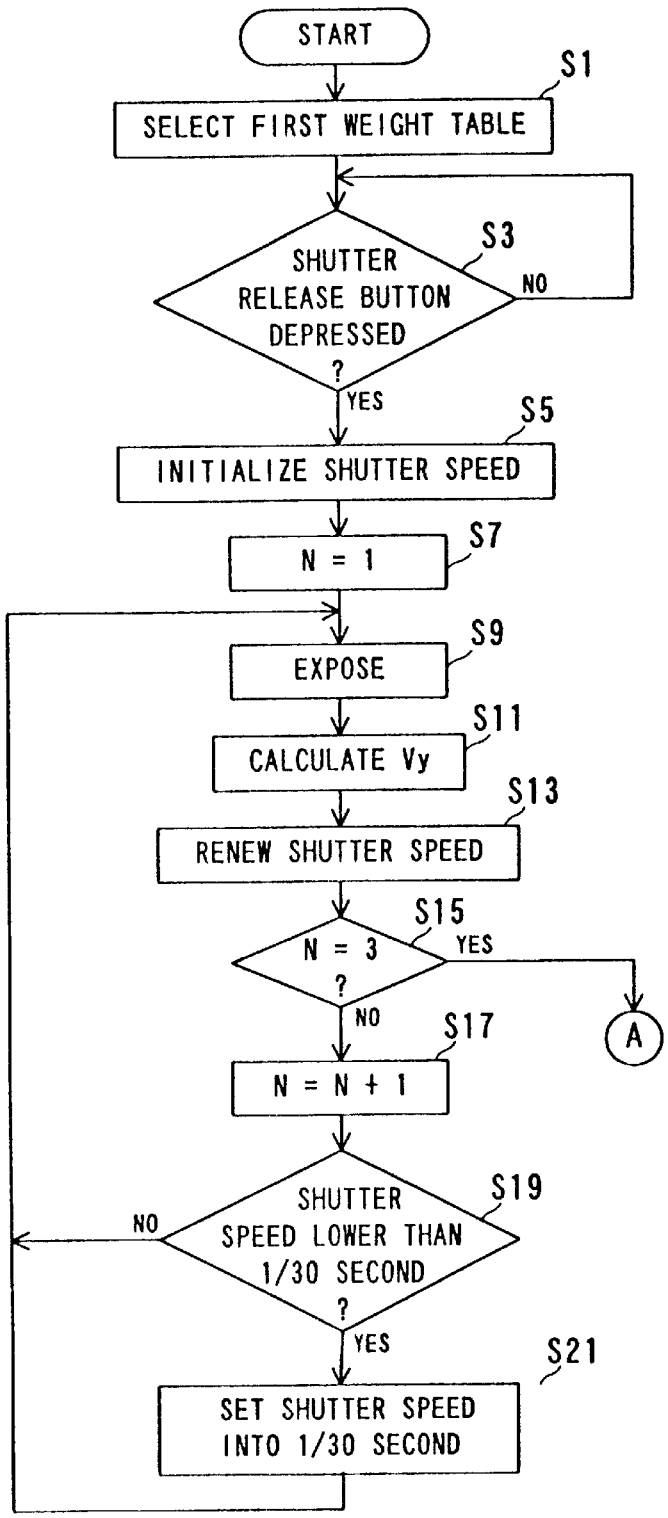
FIG. 7 is a flowchart showing a portion of an operation of FIG. 1 embodiment.
Figure 8:
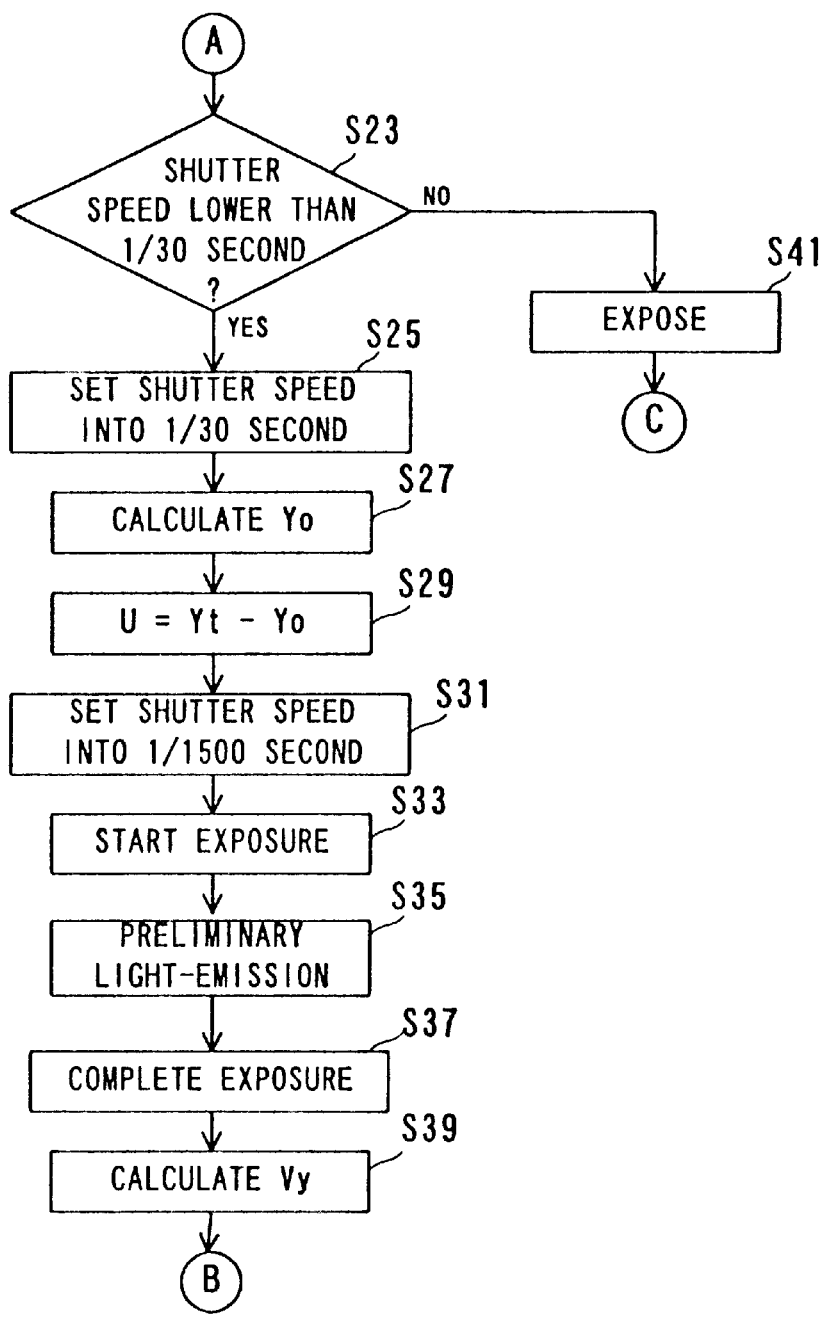
FIG. 8 is a flowchart showing another portion of the operation of FIG. 1 embodiment.
Figure 9:
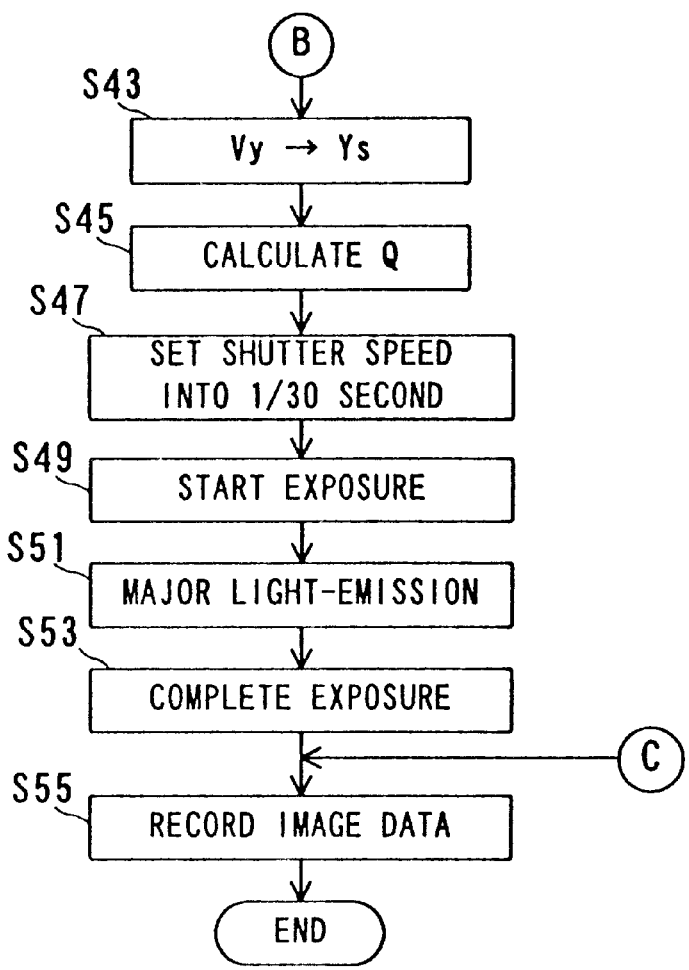
FIG. 9 is a flowchart showing the other portion of the operation of FIG. 1 embodiment.
Figure 10:
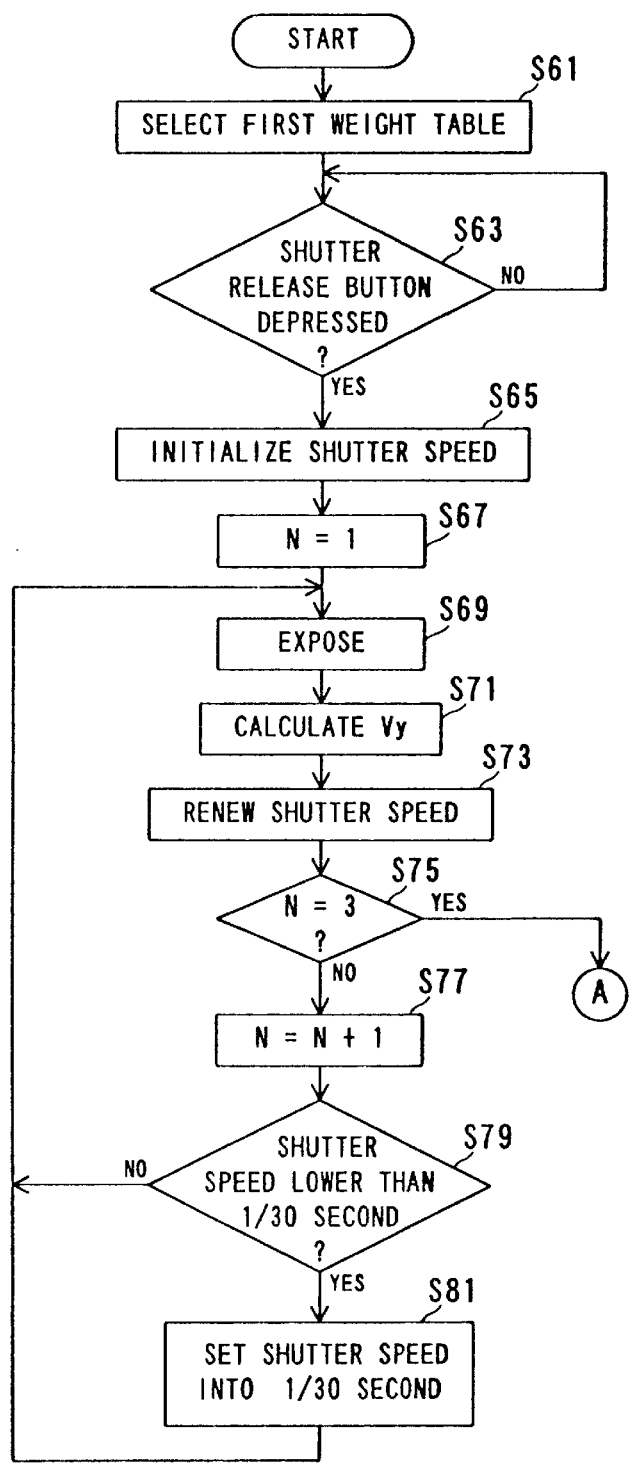
FIG. 10 is a flowchart showing further portion of the operation of FIG. 1 embodiment.
Figure 11:
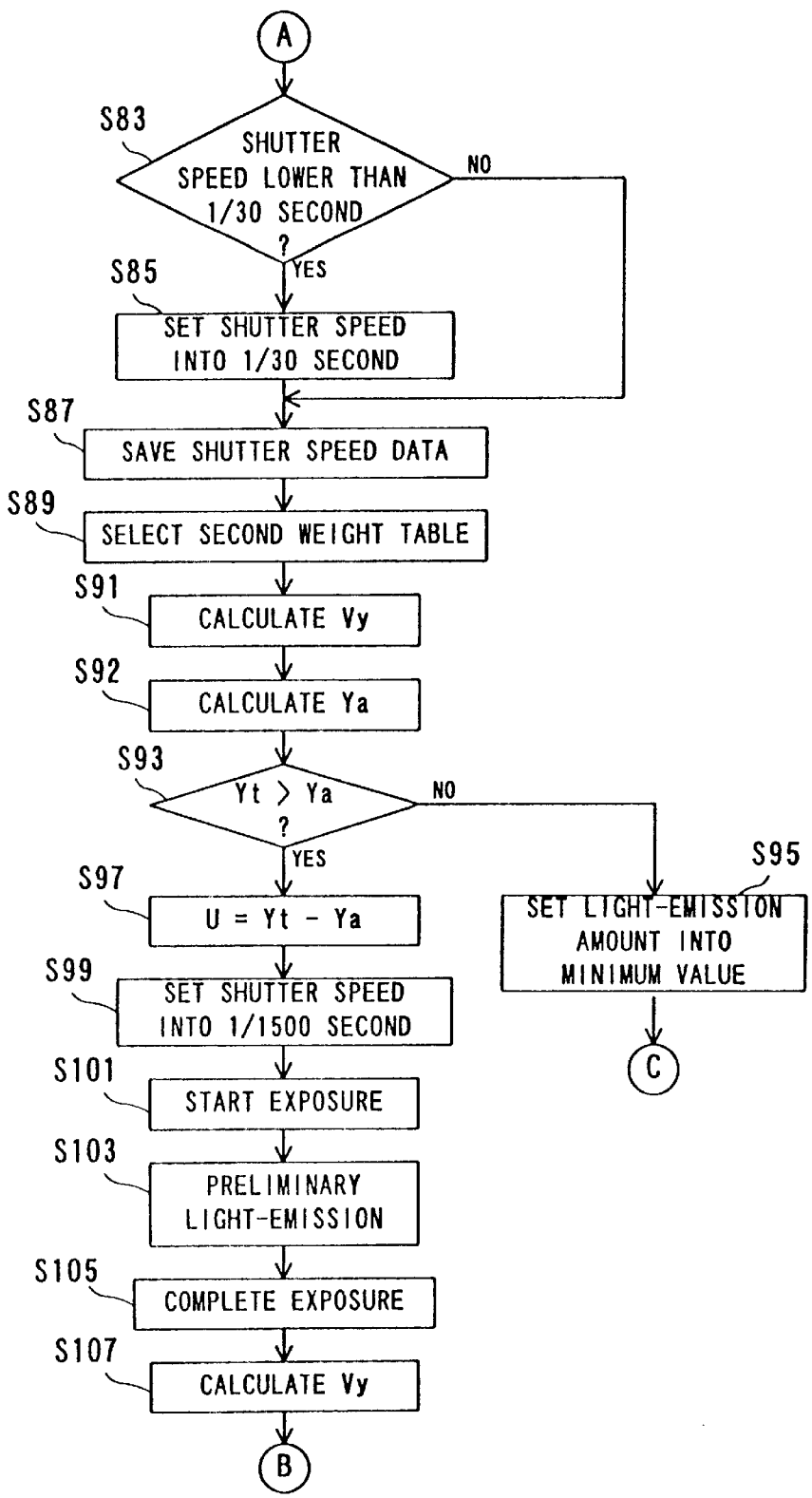
FIG. 11 is a flowchart showing the other portion of the operation of FIG. 1 embodiment.
Figure 12:
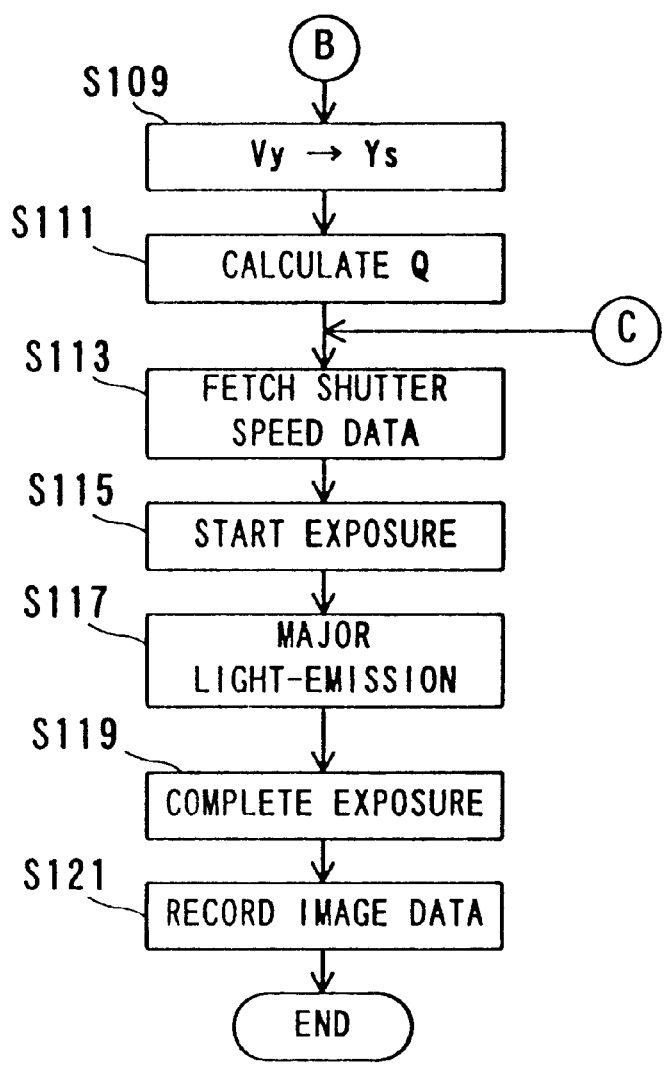
FIG. 12 is a flowchart showing further portion of the operation of FIG. 1 embodiment.
Figure 13:
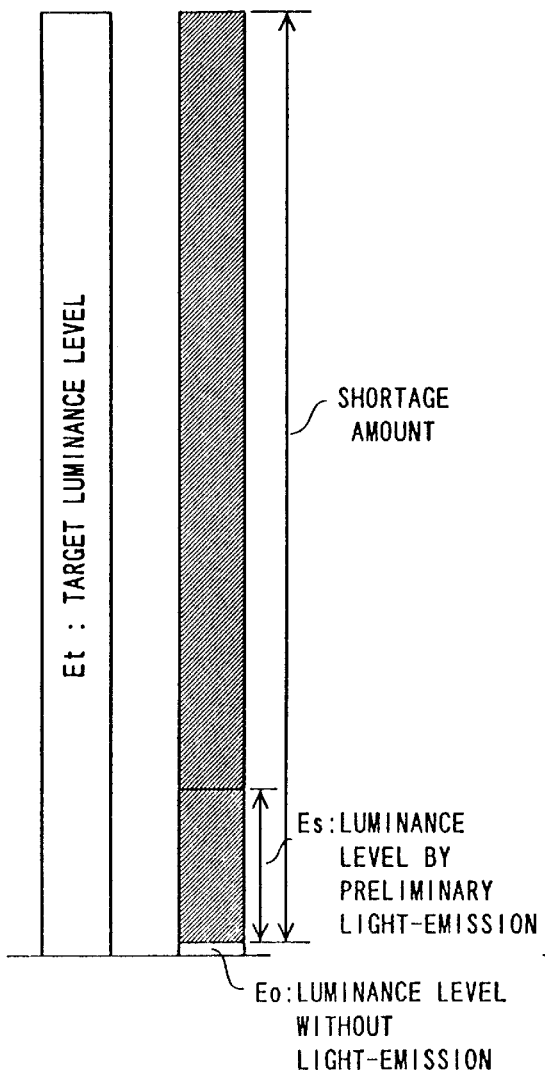
FIG. 13 is an illustrative view showing a portion of an operation of a prior art.
Figure 13:
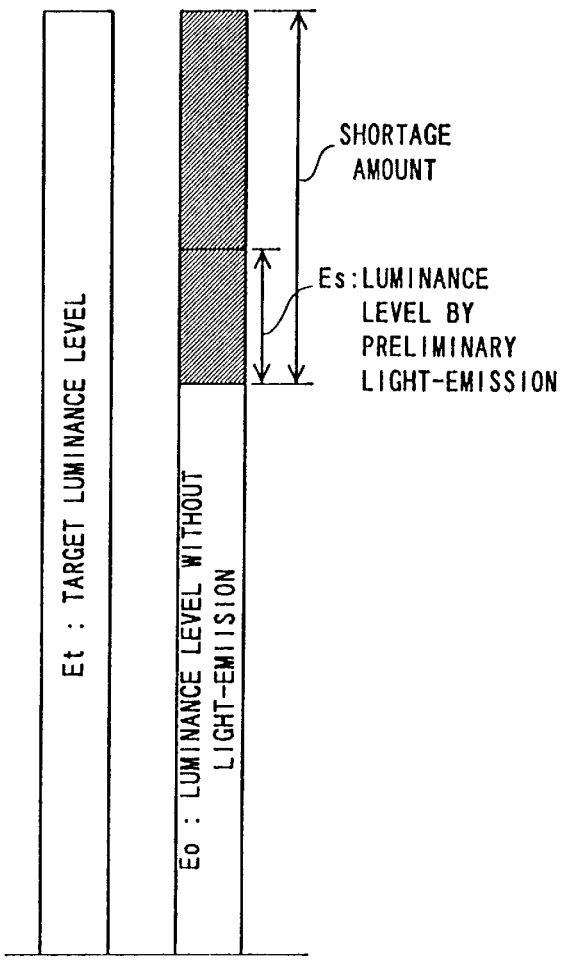

Succeedingly, with referring to flowcharts shown in FIGS. 7 to 12, an operation of the exposure adjustment and the light-emission control of the flash lamp 38 is described attaching importance to processing of the microcomputer 32. In addition, FIGS. 7 to 9 show flowcharts of the automatic light-emission mode, and FIGS. 10 to 12 show flowcharts of the forced light-emission mode. In a case where the automatic light-emission mode is selected by the mode selecting button 34, the operation is executed in accordance with the flowcharts shown in FIGS. 7 to 9, and inversely, in a case where the forced light-emission mode is selected, the operation is executed in accordance with the flowcharts shown in FIGS. 10 to 12.

Accordingly, the operation of the automatic light-emission mode is first described. In a case where the automatic light-emission mode is selected, the first weighting amount table is selected by the switch SW2 in a step S1, the process proceeds to a step S3. If it is determined that the shutter release button 36 is depressed by the operator whereby the shutter release instruction is inputted to the microcomputer 32 in the step S3, the microcomputer 32 first starts the exposure adjustment operation. That is, the microcomputer 32 applies a shutter speed setting signal to the timing generator 18 so as to initialize the shutter speed into $\frac{1}{250}$ second as a middle speed in a step S5. The timing generator 18 receives the shutter speed setting signal, and controls the output period of the sweeping pulse to the CCD imager 12 such that the charge accumulation period becomes $1/250$ seconds. Succeedingly, a variable N is initialized into "1" so as to repeat the exposure adjustment for 3 flames in a step S7, and a first exposure is performed at the shutter speed of $1/250$ seconds in a step S9. Thereafter, the luminance evaluation value Vy is calculated in a step S11.

More specifically, the image data generated by this exposure is written into the RAM 16, thereafter, the calculator 20 calculates the luminance data and the color difference data on the basis of the image data. Only the luminance data Dy is subjected to the weighting operation in the weighting circuit 22 in accordance with the weighting amount data K stored in the first weighting amount table 28, whereby the luminance data attached importance to the center of the screen is obtained. The integrator 24 digitally integrates the luminance data equal to 1 frame, and the accumulator 26 divides the integrated value by the total sum of the weighting amount data, whereby the luminance evaluation value Vy is calculated attaching importance to the center of the screen.

The microcomputer 32 compares the luminance evaluation value Vy with a target evaluation value Yt to be obtained at a most suitable exposure state in a step S13, and renews the shutter speed such that the luminance evaluation value Vy is consistent with the target evaluation value Yt. More specifically, the microcomputer 32 multiplies a current shutter speed by Yt/Vy to obtain a renewed shutter speed for a succeeding exposure. If the luminance evaluation value is "50" and the target evaluation value is "100", for example, since the luminance level is only a half of a most suitable value, the shutter speed is renewed from the current $1/250$ second to $1/125$ second of a low speed.

Succeedingly, the microcomputer 32 determines whether or not the exposure for adjusting the shutter speed has been executed for three times in a step S15, if under three times, the microcomputer 32 increments the variable N in a step S17. Furthermore, the microcomputer 32 determines whether or not the shutter speed for the succeeding exposure renewed in the step S13 is lower speed than $1/30$ second, that is, the exposure period is longer than $1/30$ second in a step S19, if "YES", the microcomputer 32 sets the shutter speed into $1/30$ second. Processes of the steps S19 and S21 are provided with considering that a minimum value of the shutter speed is $1/30$ second, and the shutter speed cannot be actually set into a lower speed than the minimum value in the digital camera 10 of this embodiment. Accordingly, in a case where a shutter speed lower than the minimum value is calculated during the exposure adjustment operation, the shutter speed is forcedly set into the minimum value.

Thereafter, the process is returned back to the step S9, a series of operation described above is repeated. That is, the shutter speed for a third exposure is obtained by a second exposure, and the shutter speed of a fourth exposure is obtained by the third exposure. When the exposure adjustment has been repeated for three times in such a manner, it is determined that the exposure adjustment has been completed, the process proceeds from the step S15 to a step S23, and it is determined whether or not the light-emission of the flash lamp 38 is needed.

More specifically, it is determined whether or not the shutter speed for the fourth exposure which is finally obtained in a step S13 is lower than $1/30$ second which is the lowest speed value of the shutter speed that the digital camera 10 of this embodiment permits, that is, whether or not the luminance evaluation value Vy does not reach the target evaluation value Yt if the charge accumulation period is not longer than $1/30$ second in a first exposure after the exposure adjustment is completed. In a case where it is determined that the shutter speed is $1/30$ second or higher than $1/30$ second, that is, it is determined that the exposure period is $1/30$ second or shorter than $1/30$ second, since the most suitable exposure is obtained at the shutter speed, it is determined that no light-emission of the flash lamp 38 is needed. On the other hand, in a case where it is determined that the most suitable exposure state cannot be obtained if the shutter speed is not longer than $1/30$ second, since the light-emission of the flash lamp 38 is needed, the process proceeds to a step S25 to control the light-emission of the flash lamp 38.

If it is determined that no light-emission of the flash lamp 38 is needed in the step S23, the process proceeds to a step S41, and the CCD imager 12 is exposed at the shutter speed renewed in the step S13 and the most suitable exposure state is obtained. That is, the microcomputer 32 cancels the light-emission of the flash lamp 38 and takes the picture of the object. Then, the image data obtained in a step S55 is recorded into the record medium 44 through the signal processing circuit 42 as the still image data. In addition, in a case where it is determined that no light-emission of the flash lamp 38 is needed in the step S23, the image data due to the exposure in the step S41 can be inputted to the signal processing circuit 42 by outputting the first switching signal to open the switch SW1 at a timing that a predetermined period has passed from the exposure in the step S41.

On the other hand, in an operation of the light-emission control of the flash lamp 38, the shutter speed setting signal is outputted so as to set the shutter speed in a major light-emission into $1/30$ second as the minimum value in the step S25, succeedingly, the luminance evaluation value expected to be obtained by exposing the CCD imager 12 at the shutter speed of $1/30$ second without emitting the flash lamp 38 is calculated as a non-emission luminance evaluation value $Y_0$. That is, the non-emission luminance evaluation value $Y_0$ is calculated by a following equation.

Non-emission luminance evaluation value $Y_0 = \{(1/30 \text{ second})/(\text{shutter speed used in third exposure})\} \times (\text{luminance evaluation value Vy obtained by the third exposure})$.

In addition, the shutter speed used in the third exposure is stored in a memory 32a included in the microcomputer 32 before the shutter speed for the fourth exposure is calculated in the step S13. In addition, $1/30$ second is equal to a first period, and the shutter speed used in the third exposure is equal to the third period. Furthermore, the luminance evaluation value Vy obtained by the third exposure is equal to a first non-emission luminance evaluation value, and non-emission luminance evaluation value $Y_0$ is equal to a second non-emission luminance evaluation value.

When the non-emission luminance evaluation value $Y_0$ is calculated as the luminance evaluation value at the shutter speed of $1/30$ second in such a manner, a difference between the target evaluation value Yt and the non-emission luminance evaluation value $Y_0$, that is, $Yt-Y_0$ is calculated as the shortage amount U of the luminance in a step S29, and furthermore, the shutter speed setting signal is applied to the timing generator 18 so as to set the shutter speed into $1/1500$ second in a step S31. Now, in a case where the shutter speed is $1/1500$ second, in other words, the charge accumulation period is drastically short such as $1/1500$ second, an influence of an external light including a light of the object on the image data becomes drastically small.

Succeedingly, the CCD imager 12 starts the exposure at the shutter speed of $1/1500$ second in a step S33. On the other hand, the microcomputer 16 outputs the flash instruction for a preliminary light-emission to the flash lamp 38 at the same time as an output of the shutter speed setting signal. If the flash lamp 38 receives the flash instruction for the preliminary light-emission, the flash lamp 38 emits the light such as the light-emission amount becomes P during the exposure of the CCD imager 12. In addition, this light-emission state is called as the preliminary light-emission state that the light-emission is preliminarily performed before the major light-emission described later.

If it is determined that the exposure at the shutter speed of $\frac{1}{1500}$ second has been completed in a step S37, the image data obtained is written into the RAM 16. Succeedingly, the weighting operation attaching importance to the center is performed in similar to the weighting operation in a non-emission state described above in a step S39, and the luminance evaluation value Vy in the preliminary light-emission is calculated by the calculator 26. The microcomputer 32 regards the luminance evaluation value Vy in the preliminary light-emission as a preliminary light-emission luminance evaluation value Ys in a step S43.

Thereafter, the microcomputer 32 calculates a major light-emission amount Q of the flash lamp 38 in the major light-emission in accordance with a following equation in a step S45.

$$Q=(U/Ys)\times P$$

In this equation, by dividing the shortage amount U of the luminance by the preliminary light-emission luminance evaluation value Ys, how many times of the evaluation value obtained by one preliminary light-emission is necessary to supplement the shortage amount is calculated, and furthermore, by multiplying the light-emission amount in the preliminary light-emission with a magnification calculated, the major light-emission amount Q is finally obtained. Now, since the shutter speed is set into a drastically short period such as $\frac{1}{1500}$ second in the preliminary light-emission, it is considered that the preliminary light-emission luminance evaluation value Ys itself depend on only the light-emission of the flash lamp 38. Accordingly, it is possible to exclude the influence of the external light in calculating the major light-emission amount, therefore, a fluctuation of the luminance due to the flicker causes no particular problem.

The microcomputer 32 thereafter outputs the shutter speed setting signal for setting the shutter speed into $\frac{1}{30}$ second to the timing generator 18 in a step S47.

Thus, the major light-emission amount Q of the flash lamp 38 is determined and the shutter speed is defined, and the CCD imager 12 starts a major exposure in a step S49. On the other hand, the microcomputer 32 outputs the flash instruction for the major light-emission to the flash lamp 38, and the flash lamp 38 emits the light during the exposure of the CCD imager 12 by a period equal to the major light-emission amount Q in a step S51.

If it is determined that the exposure at the shutter speed of $\frac{1}{30}$ second is completed in a step S53, the image data obtained is written into the RAM 16. Furthermore, in a case where it is determined that the light-emission of the flash lamp 38 is needed in the step S23, the microcomputer 32 outputs the first switching signal so as to close the switch SW1 which is keeping an open state until now at a time that a predetermined period has passed from the start of the exposure in the step S49. The switch SW1 becomes a close state in response to the first switching signal. Now, since the predetermined period is set into a period through a time that the image signal due to the major light-emission is outputted from the CCD imager 12 to a time that the image data is completely written into the RAM 16, the signal processing circuit 42 subjects the signal processing to the image data obtained due to the exposure in the step S55 and read out from the RAM 16, and the still image data processed by the signal processing circuit 42 is recorded into the record medium 44.

As described above, in the automatic light-emission mode, a little weighting amount data is applied to a surrounding area of the main object on the assumption of the center emphasis photometry in calculating the luminance evaluation value. Accordingly, the luminance of the surrounding area is considered in determining necessity of the light-emission of the flash lamp 38 and the major light-emission amount, therefore, an object included in the surrounding can receive a suitable light amount.

Succeedingly, the operation of the forced light-emission mode is described in accordance with the flowcharts shown in FIGS. 10 to 12. In addition, a description is omitted about a duplicate portion with FIGS. 7 to 9.

If the forced light-emission mode is selected by the mode selecting button 34, the switch SW2 selects in a step S61 the first weighting amount table 28 for the exposure adjustment precedingly executed, and in the exposure adjustment in the forced light-emission mode, the luminance evaluation value is calculated with using the weighting amount data of the first weighting amount table 28.

Thereafter, if the shutter release button 36 is depressed, the exposure adjustment operation from a step S65 to a step S81 is executed for three times, and then the process proceeds to a step S83. In addition, the luminance data Dy obtained due to a third exposure in a step S69 is held in a memory (not shown) provided between the calculator 20 and the weighting circuit 22. Furthermore, the shutter speed obtained by a third process of a step S73 also stored in the same memory.

In the step S83, it is determined whether or not the shutter speed finally obtained in a step S73 by a third exposure evaluation is lower speed than $\frac{1}{30}$ second, if lower speed than $\frac{1}{30}$ second, the shutter speed is forcedly set into $\frac{1}{30}$ second in a step S85. Though the shutter speed for a major exposure is obtained in the step S73 or S85 in such a manner, since the shutter speed is changed for the preliminary light-emission succeedingly executed, the shutter speed for the major exposure once obtained is held in the memory 32a included in the microcomputer 32 so as to save the shutter speed in a step S87.

Thereafter, though a light-emission amount setting operation is to be started for setting the light-emission amount of the flash lamp 38, preceding the light-emission setting operation, the second switching signal connects the switch SW2 to the side of the second weighting amount table 30 in a step S89. Accordingly, in calculating the luminance evaluation value of the screen hereafter, the second weighting amount table 30 considering only the center of the screen is used.

In a step S91, the luminance evaluation value Vy is calculated from the luminance data Dy precedingly held in the memory and based on the third exposure, succeedingly, a non-emission luminance evaluation value Ya is calculated in accordance with a following equation.

Non-emission luminance evaluation value Ya={(shutter speed in major light-emission)/(shutter speed of third time)}×luminance evaluation value Vy.

The shutter speed calculated at a time that the first weighting amount table 28 is selected is reflected to the equation. That is, the non-emission luminance evaluation value Ya is calculated with considering to some extent a surrounding luminance. Accordingly, the non-emission luminance evaluation value Ya becomes large in this case in comparison with a case where the non-emission luminance evaluation value Ya is calculated on the basis of only the luminance of the center, therefore, saturation of the surrounding luminance is controlled in a back light state.

Then, the non-emission luminance evaluation value Ya and the target evaluation value Yt are compared with each other in a step S93. In a case where Yt>Ya, since the luminance evaluation value does not reach the target evaluation value Yt even if the shutter speed is set into the minimum value, and the light-emission of the flash lamp 38 is necessary, the major light-emission amount is determined in steps S97 to S111. On the other hand, in a case where Yt≦Ya is determined in the step S93 it is recognized that the main object in the center of the screen is sufficiently subjected to a light on the screen evaluation by the exposure adjustment precedingly executed, the light-emission amount of the flash lamp 38 is in a step S95 set into a minimum light-emission amount Pmin previously defined, thereafter the process proceeds to a step S113.

In determining the major light-emission amount after the step S97, though the luminance evaluation value Vy is calculated in the preliminary light-emission state in a step S107 in similar to the automatic light-emission mode described above, since the second weighting amount table 30 is selected at this time instead of the first weighting amount table 28, a surrounding object is ignored and the main object existing in the center is noted in the screen evaluation in the preliminary light-emission. Accordingly, the major light-emission amount Q calculated in the step S111 on the basis of the luminance evaluation value Vy also becomes a light-emission amount considering only a center area.

When the major light-emission amount Q is determined in such a manner, the shutter speed for the major light-emission saved in the previous step S87 is fetched from the memory 32a, and the shutter speed setting signal showing the fetched shutter speed is applied to the timing generator 18, and the major exposure is executed in a step S117 at the shutter speed. During the major exposure, the flash lamp 38 emits the light with the major light-emission amount Q determined in the step S111 or the major light-emission amount Pmin determined in the step S95, and the image data obtained after the exposure has completed is recorded into the record medium 44 in a step S121.

In addition, the major light-emission amount Pmin is set into the minimum value capable of a little increasing the luminance of the main object with considering the operator dare to select the forced light-emission mode, though the exposure shortage concerning to the main object is already dissolved by the exposure adjustment.

As described above, in the forced light-emission mode, the luminance of the screen is evaluated with using the first weighting amount table 28, therefore, the exposure adjustment is executed attaching importance to the main object in the center of the screen and considering the surrounding area. Accordingly, a suitable exposure is obtained concerning to the object in the surrounding area. Furthermore, in a case where the exposure shortage occurs even if the exposure adjustment is executed, the luminance of the screen is evaluated with considering only the center area with using the second weighting amount table 30. That is, a light source etc. being put in the surrounding area is excluded from an evaluation object, and the exposure shortage concerning to only the main object in the center area is supplemented. Therefore, it is possible to correct the back light.

Furthermore, the shutter speed in the preliminary light-emission is made high such that the influence of the external light excepting a light of the flash lamp can be excluded in any mode, even if a light of illumination is included in the object, and the light of the illumination is changed by the flicker, it is possible to precisely determine the major light-emission amount Q without the influence of the flicker.

In this embodiment, though the luminance data of all the blocks are digitally integrated to obtain the luminance evaluation value, it is needless to say that the luminance evaluation value may be calculated with thinning out some blocks such as specific one block is to be an object for the digitally integration out of ten blocks in both the horizontal direction and the vertical direction so as to shorten a processing period.

Furthermore, functions of the weighting amount table 28, the weighting circuit 22, the calculators 20 and 26, the integrator 24 and the signal processing circuit 42 may be put into a single microcomputer with a function of the microcomputer 32 so as to process such functions by a software.

Evenmore, in this embodiment, though the luminance evaluation value Ys in the preliminary light-emission is calculated at the shutter speed of $\frac{1}{1500}$ second, the shutter speed is not particularly restricted to $\frac{1}{1500}$ second. That is, since a light-emission period of the flash lamp 38 in the preliminary light-emission is approximately 50 microseconds, the shutter speed has only to satisfy a condition that the shutter speed, that is, the exposure period is longer than the light-emission period, and to sufficiently restrain the influence of the external light, and even if the shutter speed is $\frac{1}{2000}$ second, $\frac{1}{5000}$ second and $\frac{1}{10000}$ second as a maximum speed, a similar advantage is obtained. It is ideally desirable that the shutter speed, that is, the exposure period is extremely close to the light-emission period of the flash lamp 38.

Similarly, though the shutter speed is set into $\frac{1}{30}$ second in the main light-emission, the shutter speed is not restricted to the speed, and the shutter speed may be set into $\frac{1}{29}$ second etc., for example, so as to obtain a sufficient exposure. Furthermore, the shutter speed may be set into $\frac{1}{50}$ second, for example, with considering an unintentional vibration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for taking a picture of an object by making a flash lamp perform a main light-emission with a main light-emission amount and exposing an image sensor, the camera comprising:
    a detector for detecting a luminance signal from a camera signal outputted from said image sensor;
    an evaluator for evaluating said luminance signal and outputting a luminance evaluation value;
    a first exposer for exposing said image sensor without a light-emission of said flash lamp;
    a second exposer for making said flash lamp perform a preliminary light-emission with a preliminary light-emission amount and exposing said image sensor; and
    a calculator for calculating said main light-emission amount on the basis of a first non-emission luminance evaluation value outputted from said evaluator on the basis of an exposure of said first exposer, a preliminary light-emission luminance evaluation value outputted from said evaluator on the basis of an exposure of said second exposer, a target luminance evaluation value and said preliminary light-emission amount.

2. A digital camera according to claim 1, wherein said evaluator includes a weighter for weighting said luminance signal, and a generator for generating said luminance evaluation value on the basis of an output of said weighter.

3. A digital camera according to claim 2, wherein said weighter includes a weighting amount table in which a plurality of weighting amount data used for a weighting operation are stored, and said generator includes an integrator for integrating the output of said weighter, and a divider for dividing an output of said integrator by a total sum of said weighting amount data.

4. A digital camera according to claim 1, further comprising:
  a signal processor for subjecting predetermined signal processing to said camera signal generated on the basis of said main light-emission; and
  a recorder for recording an output of said signal processing means into a record medium.

5. A digital camera according to claim 1, wherein said second exposer exposes said image sensor for a time period during which said preliminary light-emission luminance evaluation value is not influenced by the luminance of said object.

6. A digital camera for taking a picture of an object by making a flash lamp perform a main light-emission with a main light-emission amount and exposing an image sensor, the camera comprising:
  a mode setter for setting one of a first mode and a second mode;
  a first weighting amount table corresponding to said first mode and storing first weighting amount data fixed in value;
  a second weighting amount table corresponding to said second mode and storing second weighting amount data fixed in value;
  a detector for detecting a luminance signal on the basis of a camera signal outputted from said image sensor;
  a weighter for weighting said luminance signal in accordance with the table corresponding to a mode set by said mode setter;
  a generator for generating a luminance evaluation value on the basis of an output of said weighter;
  a first exposer for making said flash lamp perform a preliminary light-emission and exposing said image sensor; and
  a first calculator for calculating said main light-emission amount on the basis of a preliminary light-emission luminance evaluation value outputted from said generator on the basis of an exposure of said first exposer, wherein said first mode is an automatic light-emission mode for performing said main light-emission in response to the luminance of said object, and said second mode is a forced light-emission mode for making said flash lamp perform said main light-emission without respect to the luminance of said object.

7. A digital camera according to claim 6, wherein, in said preliminary light-emission, said weighter selects said first weighting amount table in said first mode, and selects second weighting amount table in said second mode.

8. A digital camera according to claim 7, further comprising
  a second exposer for exposing said image sensor without a light-emission of said flash lamp, wherein said weighter selects said first weighting amount table in an exposure of said second exposer.

9. A digital camera according to claim 8, further comprising a second calculator for calculating a most suitable exposure period that a target luminance evaluation value is obtained without the light-emission of said flash lamp, on the basis of a non-emission luminance evaluation value outputted from said generator on the basis of the exposure of said second exposer.

10. A digital camera according to claim 9, further comprising:
  a first comparator for comparing said most suitable exposure period and a longest exposure period in said first mode; and
  a canceller for canceling said main light-emission when said most suitable exposure period is shorter than said longest exposure period.

11. A digital camera according to claim 1, wherein said first weighting amount data corresponding to a surrounding portion of said object is smaller than said first weighting amount data corresponding to a center portion of said object and is larger than "0".

12. A digital camera according to claim 9, further comprising:
  a second comparator for comparing said most suitable exposure period and a longest exposure period in said second mode;
  a first holder for holding said most suitable exposure period as an exposure period in said main light-emission when said most suitable exposure period is shorter than said longest exposure period; and
  a second holder for holding said longest exposure period as the exposure period in said main light-emission when said most suitable exposure period is equal to said longest exposure period or longer than said longest exposure period.

13. A digital camera according to claim 6, wherein said second weighting amount data corresponding to a surrounding portion of said object has a value of "0".

14. A digital camera for taking a picture of an object by making a flash lamp perform a main light-emission with a main light emission amount and exposing an image sensor, the camera comprising:
  a detector for detecting a luminance signal form a camera signal outputted from said image sensor;
  an evaluator for evaluating said luminance signal and outputting a luminance evaluation value;
  a first exposer for exposing said image sensor without a light-emission of said flash lamp;
  a second exposer for making said flash lamp perform a preliminary light-emission with a preliminary light-emission amount and exposing said image sensor; and
  a calculator for calculating said major light-emission amount on the basis of a non-emission luminance evaluation value outputted from said evaluator on the basis of an exposure of said first exposer, a preliminary light-emission luminance evaluation value outputted from said evaluator on the basis of an exposure of said second exposer, a target luminance evaluation value and said preliminary light-emission value.

* * * * *